(12) United States Patent
Scott et al.

(10) Patent No.: US 6,244,301 B1
(45) Date of Patent: Jun. 12, 2001

(54) BULKHEAD BARRIER MEMBER

(75) Inventors: Craig A. Scott, 402 Vista Ter., Muskegon, MI (US) 49442; Randolph F. Stukel, 17189 Barryknoll Way, Granger, IN (US) 46530

(73) Assignees: Randolph F. Stukel, Granger, IN (US); Craig A. Scott, Muskegon, MI (US)

( * ) Notice: Subject to any disclaimer, the term of this patent is extended or adjusted under 35 U.S.C. 154(b) by 0 days.

(21) Appl. No.: 09/358,291

(22) Filed: Jul. 21, 1999

(51) Int. Cl.⁷ ........................................ F16L 55/11
(52) U.S. Cl. ................................. 138/89; 138/91
(58) Field of Search ............................. 138/89, 91

(56) References Cited

U.S. PATENT DOCUMENTS

| | | | |
|---|---|---|---|
| 798,031 | * 8/1905 | Gherky | 138/91 |
| 2,139,491 | * 12/1938 | Dawson | 138/89 |
| 2,256,775 | * 9/1941 | Hubbell | 138/89 |
| 2,536,431 | * 1/1951 | Endsley | 138/89 |
| 3,860,037 | * 1/1975 | Rowe | 138/89 |
| 4,425,943 | * 1/1984 | Martin | 138/89 |
| 4,462,430 | * 7/1984 | Anthony et al. | 138/91 |
| 4,669,506 | * 6/1987 | Ramsey, Jr. | 138/89 |
| 4,875,615 | * 10/1989 | Savard | 138/89 |
| 5,918,638 | * 7/1999 | Davis | 138/89 |

* cited by examiner

*Primary Examiner*—James Hook
(74) *Attorney, Agent, or Firm*—Emrich & Dithmar

(57) ABSTRACT

A bulkhead barrier member for separating a tubular member into chamber sections is described. The barrier member has a diameter between about 0.001 to 0.005 inches less than the diameter of the inner surface of the tubular member when positioned within the tubular housing. Upon compression of the barrier member, the barrier member is radially expandable to engage the inner surface of the tubular member to provide a sealed barrier between the chamber sections.

11 Claims, 4 Drawing Sheets

BULKHEAD BARRIER MEMBER

BACKGROUND OF THE INVENTION

The present invention relates to a novel bulkhead barrier member which is structurally arranged to be inserted within a tubular housing and expanded radially to engage the tubular housing to separate the housing into sections or chambers that are sealed from one another.

In the past, bulkhead barriers or members have been utilized to separate tubular housings into sections or chambers. One such type of prior art bulkhead barrier includes disc member or members that are welded to the interior surface of the tubular housing to separate and seal the housing into sections or chambers. However, the time and expense in inserting and in welding the disc member or members to the interior housing wall to provide a barrier severely restricts such utilization in mass-produced assemblies, such as airbag detonation assemblies.

Additionally, it has been suggested that a shaft member may be selectively machined from both ends, leaving a wall between the two machined chambers. However, such a chambered housing is expensive and costly to manufacture. Thus, for mass-produced articles, for example, airbag assemblies, such an operation of manufacture is unacceptable.

Also, it has been suggested that a barrier member may be inserted within a tubular housing and the tubular housing is crimped and compressed to seal against the outer radial peripheral edge of the barrier member to separate the housing into sections or chambers. However, such assemblies result in deformation of the housing wall which may weaken the housing and results in inadequate sealing and separation between the chambers. Accordingly, such assemblies have limited acceptance in the marketplace.

SUMMARY OF THE INVENTION

It is an object of the present invention to provide a novel bulkhead barrier assembly which divides and separates a tubular housing into separate chambers.

It is another object of the present invention to provide a novel method and apparatus for the placement of a bulkhead barrier within a tubular housing to provide separate chambers within the housing.

It is yet another object of the present invention to provide a novel bulkhead barrier member which, when positioned within a tubular housing, is radially expandable to sealingly engage the inner surface of the tubular housing to separate and seal the tubular sections or chambers from one another.

In accordance with one embodiment of the present invention, a bulkhead barrier member is comprised of a pair of circular saucer-shaped members each having a planar central portion and an angled outer radial peripheral edge portion extending therearound. The pair of saucer-shaped members are mounted in back-to-back relationship with respect to one another and inserted into the tubular housing or member. The resultant structure provides a yoke-type or V-shaped outer radial peripheral edge configuration with respect to the back-to-back central planar portions. The barrier member is dimensioned to have a diameter of between about 0.001 to 0.005 inches less than the inner diameter of a tubular member. When the barrier member is inserted and predeterminedly located within the tubular member, against an anvil or stop member, compression of the barrier member causes the angled outer radial peripheral edge portions to be compressed towards one another to engage the inner wall surface of the tubular housing. This compression causes the angled edge portions of the barrier member to be compressed and moved to a more planar configuration with respect to the central portion. This compression and movement increases the diameter of the barrier member. This resultant increased diameter causes the radial peripheral edge portions of the barrier member to sealingly engage the inner surface of the tubular member to provide a wall or barrier which separates the chambers within the tubular member and which provides a sealed barrier between the chambers.

The compression member utilized in compressing the peripheral end wing portions of the barrier member against the anvil or stop member may be a hydraulic driven piston member which engages the peripheral edge portions to compress the same against an anvil member during the inward stroke of the piston. The method of inserting the barrier member into the housing and then engaging and compressing the outer radial peripheral edge portion to increase the diameter of the barrier member to provide a seal with the tubular housing is efficient and very cost effective. Also, the method permits the positioning of the barrier member or wall within the tubular housing at any predetermined location within the housing to provide a barrier between different sized chambers.

The resultant sealed section or chamber structure has particular application in airbag assemblies, and, in particular, in the development and utilization of "smart" airbag detonating assemblies. In such assemblies, it is highly desirable to place separate and predetermined amounts of propellants in the respective sealed sections or chambers of the tubular airbag housing or detonator assembly and to maintain a sealed and fixed barrier between the two separate detonating chambers. This permits the airbag to be operable based upon the degree of force or the speed at which a vehicle engages or contacts an object. Also, it is possible to size the detonating capacity of the assembly to correlate to the size of the end user or passenger sitting in front of the airbag assembly. For example, if the passenger is a small child, then it would be desirous to have only a small or partial detonation of the airbag assembly to prevent injury to the young passenger. However, if the passenger is an adult, then one or both of the chambers or the larger chamber of the airbag detonator could be triggered to inflate the airbag. Accordingly, there is an important need to have a detonating assembly where controlled detonation may be achieved which is readily and cheaply manufactured.

Additionally, the present invention has further application in the dividing of any cylinder housing or tubular member into separate sealed compartments or chambers. Thus, any fluids contained within a housing in separate chambers or compartments are sealed from one another. Such fluids can take the form of either liquids or gases. For example, chambers containing acetylene and oxygen gases used in various types of welding or cutting operations benefit from the inexpensive separated and sealed housing chambers provided in accordance with the present invention.

The present invention consists of certain novel features and structural details hereinafter fully described, illustrated in the accompanying drawings, and specifically pointed out in the appended claims, it being understood that various changes in the details may be made without departing from the spirit or sacrificing any of the advantages of the present invention.

DESCRIPTION OF THE DRAWINGS

The foregoing description and other characteristics, objects, features and advantages of the present invention will become more apparent upon consideration of the following detailed description, having reference to the accompanying drawings wherein.

DESCRIPTION OF THE PREFERRED EMBODIMENT

Figure 1:
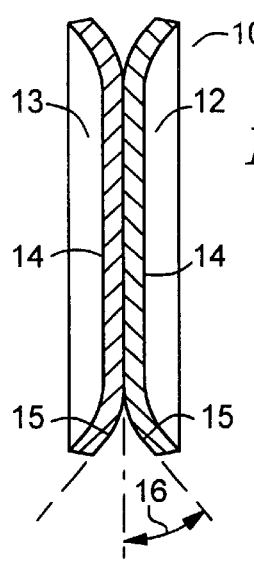
FIG. 1 is a cross-sectional view of one embodiment of the barrier member in accordance with the present invention.
Figure 2:
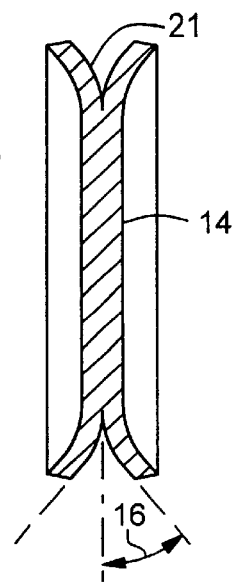
FIG. 2 is a cross-sectional view of a further embodiment of the barrier member in accordance with the present invention.

Referring now to the several drawings wherein like numerals have been used throughout the several views to designate the same or similar parts, FIGS. 1 and 2 illustrate embodiments of the novel bulkhead barrier member 10 in accordance with the present invention. As shown in FIG. 1, the bulkhead barrier member 10 is comprised of a pair of saucer-shaped members 12 and 13, respectively. Each of the saucer-shaped members includes a central planar portion 14 and an outer radial peripheral edge or flange portion 15 integral to the planar central portion 14. As shown in FIG. 1, the angle 16 of the diverging flange portion 15 with respect to the planar central portion 14 may range between an angle of 20 to 30 degrees. However, the preferred angle range is approximately 25 degrees, plus or minus 1 degree.

FIG. 2 illustrates a further embodiment of the present invention wherein the bulkhead barrier member 10 is comprised of a central planar portion 14 having a yoke-type or V-shaped outer radial peripheral edge portion 21 extending therearound. As set forth above with respect to the first embodiment, the barrier member 10 is dimensioned to have a diameter of between about 0.001 to 0.005 inches less than the inner diameter of the tubular member.

Figure 5:
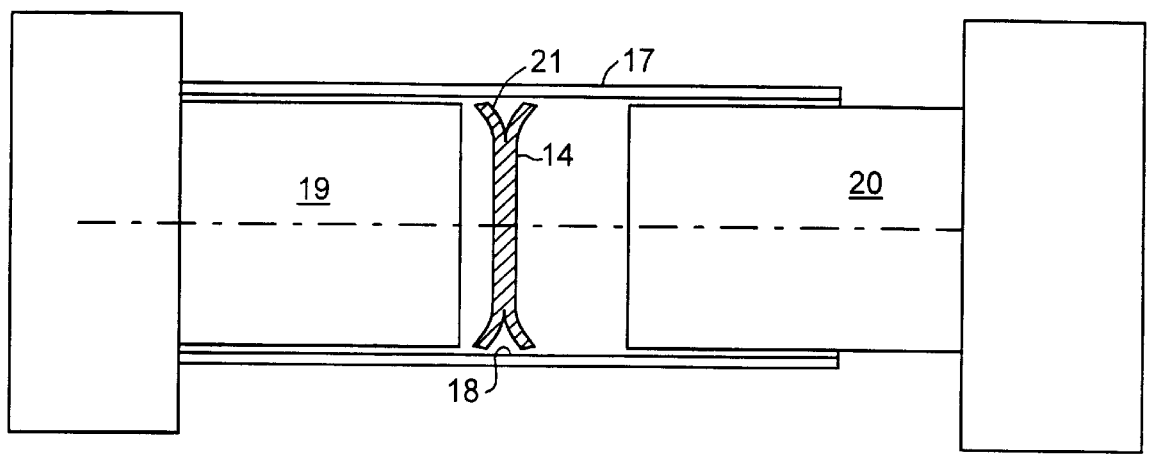
FIG. 5 is a cross-sectional view illustrating the insertion of the embodiment of the barrier member shown in FIG. 2 within a tubular housing.
Figure 6:
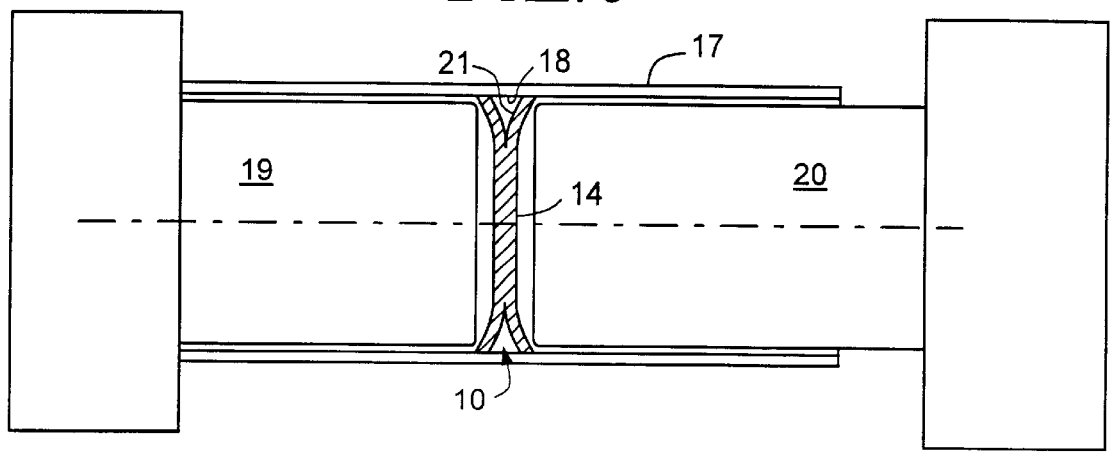
FIG. 6 is a cross-sectional view illustrating the positioning in the compression and the sealing of the barrier member shown in FIG. 5 within a tubular housing.
Figure 9:
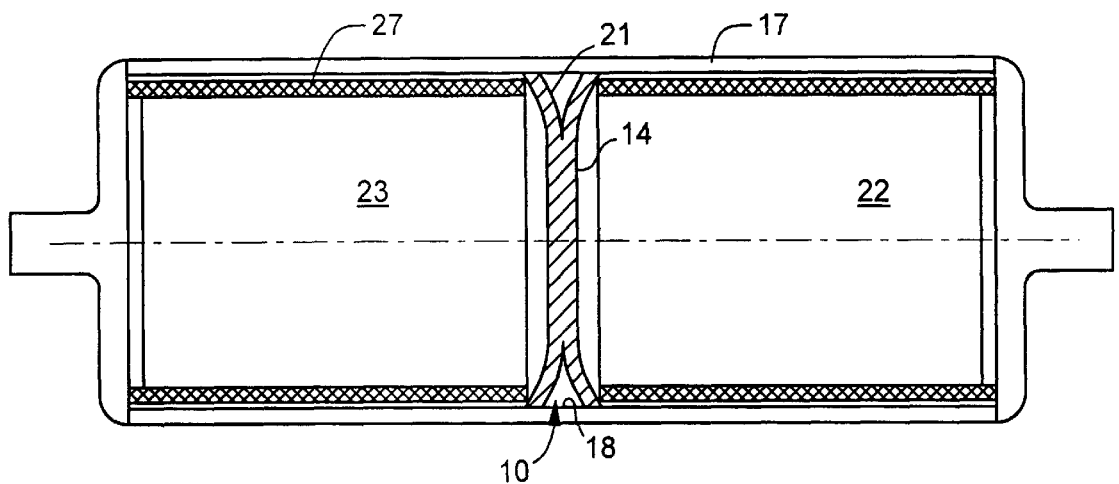
FIG. 9 is a cross-sectional view illustrating the positioning and the retention of the barrier member as shown in FIG. 2 within a airbag detonating assembly.
Figure 10:
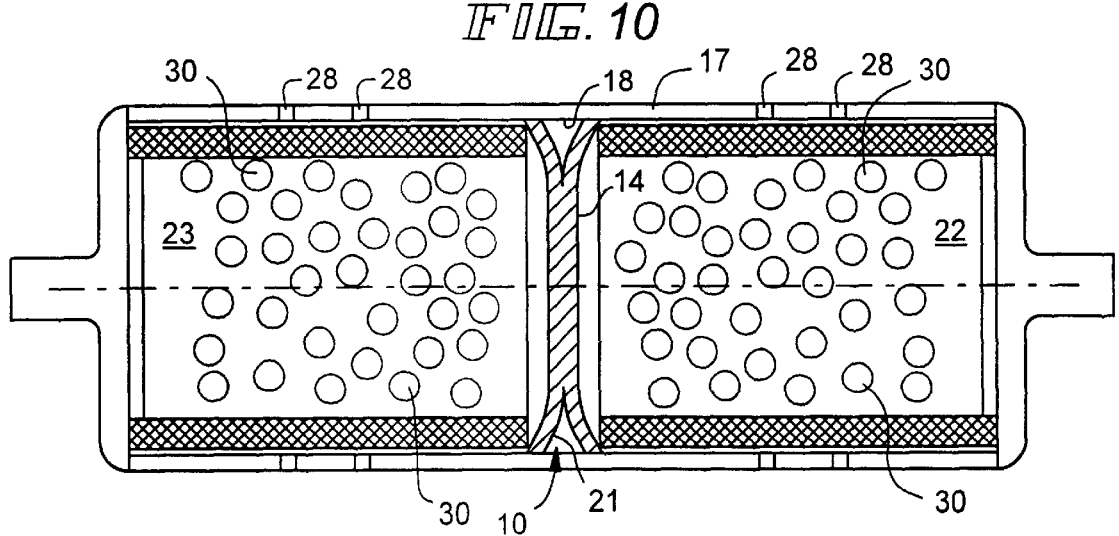
FIG. 10 is a cross-sectional view of the embodiment of the barrier member in accordance with FIG. 9 with the airbag detonating assembly containing propellant.

Also, as in FIG. 2, the angle 16 of the legs of the V-shaped peripheral edge portion with respect to the centerline 24 of the barrier centerline may range between about an angle 16 of 20 to 30 degrees, with a preferred angle range is approximately 25 degrees, plus or minus 1 degree. Also, as shown in FIGS. 5 and 6, the barrier member 10 of FIG. 2 is positioned within the tubular housing 17 at a predetermined location against the anvil member 19. The compression member 20 engages the barrier member 10 and compresses the V-shaped outer peripheral edge portions 21 towards one another to enlarge the diameter of the barrier member 10 against the interior surface 18 of the tubular housing and to provide a seal and barrier between chambers 22 and 23. As shown in FIGS. 6 and 9–10, the compression of the V-shaped peripheral edge portion 21 resulting from the engagement of the compression member with the barrier member causes the barrier member to engage the inner tubular surface 18 of the tubular housing 17. This seals the barrier member with the tubular member and provides a sealed barrier between the chambers 22 and 23 of the tubular housing. The compression member 20 utilized in compressing the outer peripheral edges or flange portion 15 or the yoke-type or V-shaped outer peripheral edge portion 21 may be a hydraulic driven piston member, as is known in the art.

Figure 3:
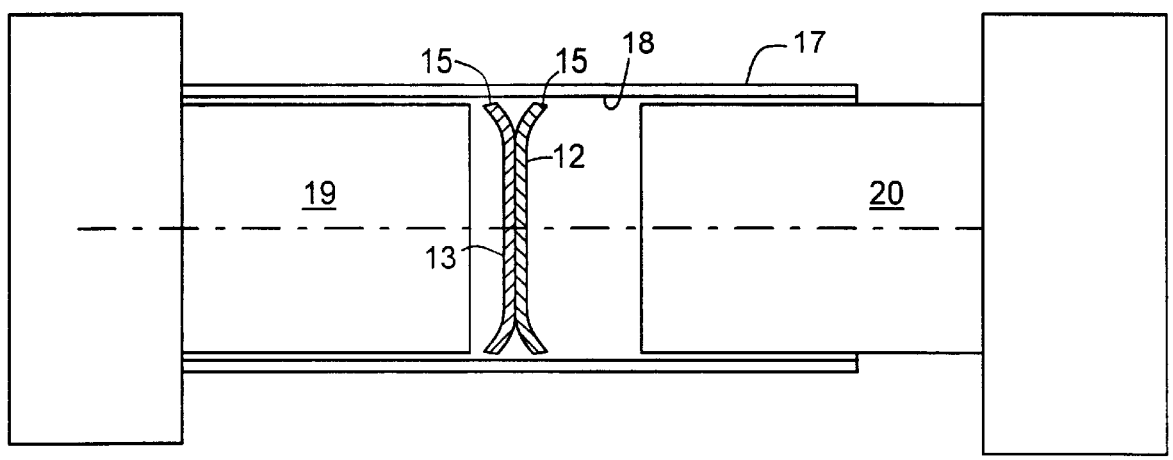
FIG. 3 is a cross-sectional view illustrating the insertion of the embodiment of the barrier member shown in FIG. 1 within a tubular housing.
Figure 4:
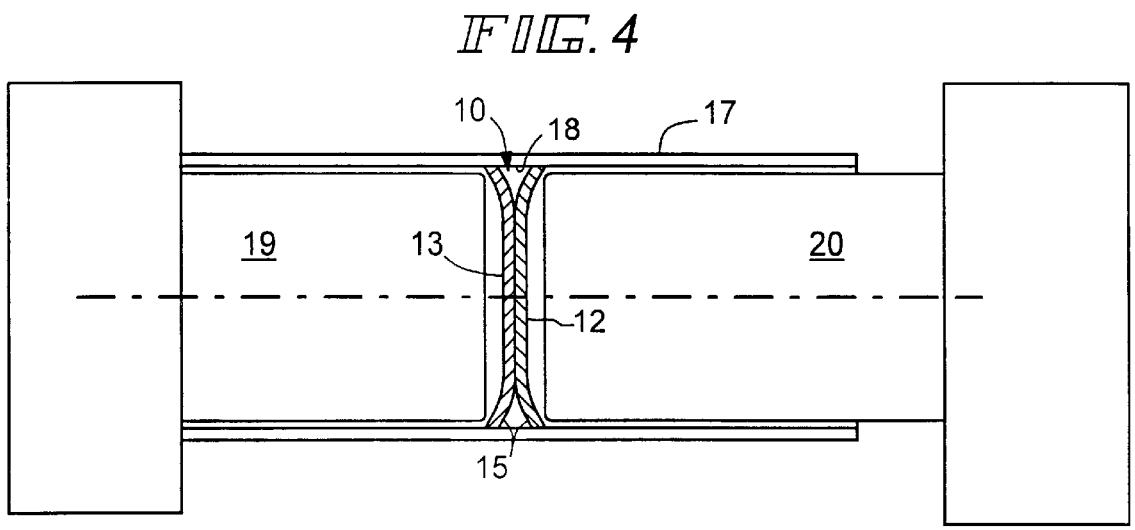
FIG. 4 is a cross-sectional view illustrating the positioning, the compression and the sealing of the barrier member shown in FIG. 3 within a tubular housing.
Figure 7:
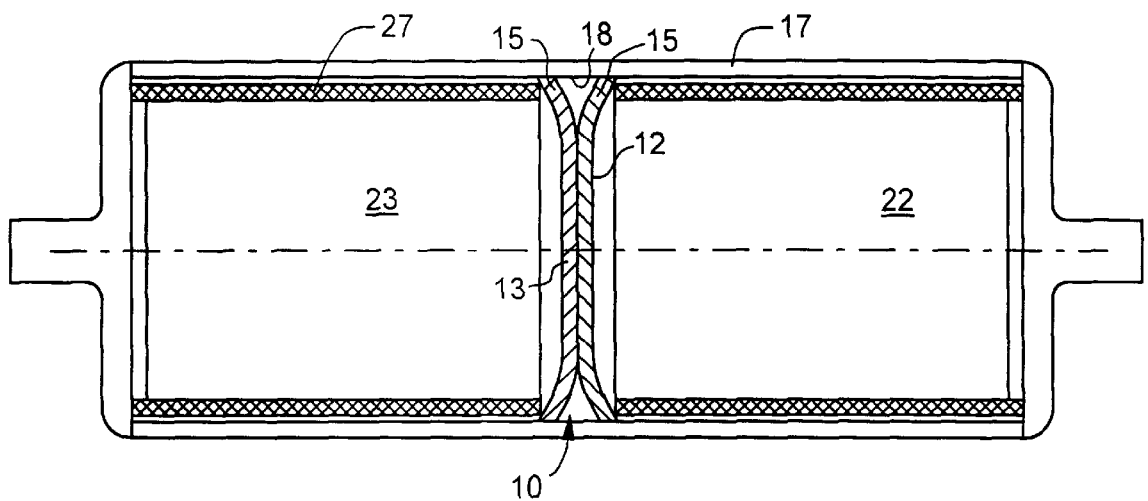
FIG. 7 is a cross-sectional view illustrating the positioning and retention of the barrier member as shown in FIG. 1 within the housing of a airbag detonating assembly.
Figure 8:
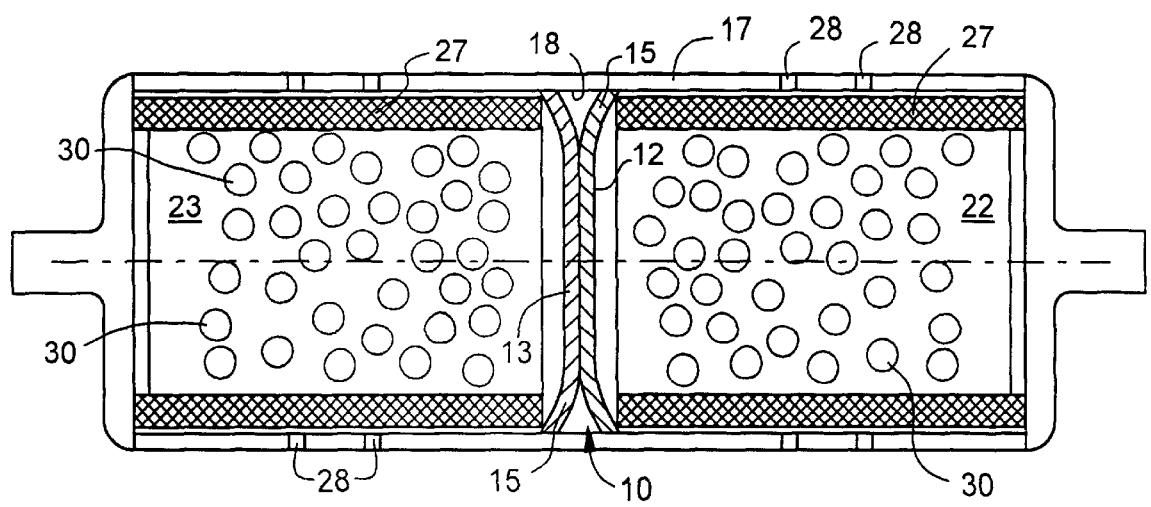
FIG. 8 is a cross-sectional view illustrating the detonating chambers of the airbag assembly containing the propellent therein separated by the embodiment of barrier member shown in FIG. 1.

The barrier member 10 in accordance with the present invention has particular application in providing a barrier wall and seal member between chambers 22 and 23 within a tubular housing 17, as shown in FIGS. 3–10. In FIGS. 3 and 5, the barrier member 10 illustrated in FIG. 1 and FIG. 2 is inserted within the tubular housing 17. Also, as illustrated in FIGS. 3 and 5, the diameter of the barrier member 10 is less than the interior diameter of the tubular housing 17. Preferably, the barrier member 10 should be dimensioned to have a diameter of between about 0.001 to 0.005 inches less than the inner diameter of the tubular member or housing into which it is inserted. Specifically, as shown in FIGS. 3 and 5, the barrier member 10 is inserted within the tubular housing 17 against an anvil or stop member 19. The anvil or stop member 19 is positioned within the tubular housing 17 at a predetermined location where the chambers 22 and 23 are desired to be separated by the barrier member 10. A plunger or compression member 20 is structurally arranged to engage the barrier member at the outer peripheral edge or flange portion 15 of the barrier member 10 to compress the flange portion and to cause the peripheral edge or flange portion members 15 of the respective saucer-shaped members 12 and 13 to be compressed and moved towards one another to compress and wedge against the inner surface of the tubular housing. This compression of the edge or flange portion members increases the diameter of the barrier member 10 to provide a seal with the inner surface 17 of the tubular housing because the more planar—like configuration of the barrier member increases the diameter of the barrier to a diameter greater than the inner diameter of the tubular member. As shown in FIGS. 4, 7 and 8, the outer radial peripheral edge portions 15 sealingly engage the inner surface 18 of the tubular housing to provide separated chambers 22 and 23 within the tubular member. The wedging engagement of the barrier member 10 with the inner surface of the housing 17 seals and prevents the flow of fluids between the two chambers and, in the case of "smart" airbag detonators 25, as shown in FIGS. 8 and 10, permits one chamber to ignite without disturbing the adjacent chamber separated and sealed by the bulkhead barrier member.

Thus, the method of positioning the barrier member at a predetermined location within the tubular housing and compressing the same to expand the barrier member to engage the inner surface of the housing provides a barrier between the resultant chambers within the tubular members and permits the rapid manufacture of a segmented tubular housing which is inexpensive and which provides a uniform, consistently sealed and chambered housing. The assembly with the barrier member wedged within the housing in accordance with the present invention has been tested up to 16,000 pounds of pressure with no leakage between the chambers. This pressure resistance greatly exceeds the pressures obtainable during detonation of the airbag assembly. Also, as is Illustrated in the drawings, the placement of the barrier within the tubular housing does not result in deformation of the housing or weakening of the tubular housing.

As shown in FIGS. 7–10, FIGS. 7 and 9 illustrate the position of a barrier member 10 in accordance with the present invention within a tubular housing of the airbag assembly. Two gas storage chambers, 22 and 23, are provided and separated by the bulkhead member 10. Each of the gas storage chambers include filter media 27 therearound and exhaust ports 28 which permit the filtered detonation gas to be directed into the airbag. As shown in FIGS. 8 and 10, the chambers 22 and 23 each contain gas generating material 30 which, when detonated, causes the generated gas to pass through the filter media, and exit ports to inflate the airbag (not shown).

What is claimed is:

1. A bulkhead assembly including in combination:
    a tubular housing; and
    a bulkhead barrier member free of openings therein for separating said tubular housing into chambers, said barrier member having a diameter of between about 0.001 to 0.005 inches less than the diameter of said inner surface of said tubular housing when inserted into said tubular housing, and with said barrier member being compressable and radially expandable to sealingly engage and permanently affix said barrier member to said inner surface of said tubular housing.

2. In the bulkhead assembly in accordance with claim 1, wherein said bulkhead barrier member is comprised of a planar portion having a V-shaped outer peripheral flange portion including two leg portions extending therearound, with said leg portion of said peripheral outer flange portion being compressable and radially expandable to sealingly engage said inner surface of said tubular housing to provide chambers sealed from one another within said tubular housing.

3. In the bulkhead assembly in accordance with claim 2, wherein said V-shaped outer peripheral flange portion includes two leg portions is comprised of a pair of diverging wing members extending radially at an angle of between about 20–30 degrees with respect to said planar portion.

4. In the bulkhead assembly in accordance with claim 3, wherein said pair of diverging wing members extend radially at an angle of about 25 degrees.

5. In the bulkhead assembly in accordance with claim 1, wherein said bulkhead barrier member is comprised of a pair of saucer-shaped members, each member having a planar central portion and an angled outer peripheral flange portion and defining a centerline therebetween, with said saucer-shaped members positioned in a back-to-back position and said angled outer peripheral edged portions diverging from one another when said pair of saucer-shaped members are inserted into said tubular housing, said angled peripheral flange outer portions of said saucer members being compressible and movable with respect to said planar central portion towards one another to sealingly engage said inner surface of said tubular member to provide chambers sealed from one another.

6. In the bulkhead assembly in accordance with claim 5, wherein said angled outer peripheral edge portions diverge at an angle of between about 20–30 degrees with respect to said centerline of said planar central portion.

7. In the bulkhead assembly in accordance with claim 6, wherein said angled outer peripheral edge portions diverge at an angle of about 25 degrees.

8. The method of providing a barrier seal within a tubular housing, including the steps of:
    positioning a circular barrier member free of openings therein and having an expandable outer V-shaped peripheral edge flange portion against a stop member located at a predetermined position within the tubular housing; and
    compressing the V-shaped peripheral edge flange portion of said barrier member against said stop member to expand said barrier member to engage the tubular housing to provide a fixed barrier seal between the resultant chambers of the tubular housing.

9. In the method of providing a barrier seal in accordance with claim 8, wherein said V-shaped edge flange portion is comprised of two leg portions which diverge outwardly from one another at an angle of between about 20–30 degrees with respect to the centerline of said barrier member.

10. The method of providing a barrier seal within a tubular housing, including the steps of:
    positioning a circular barrier member comprised of a pair of saucer-shaped members against a stop member located at a predetermined position within the tubular housing, each barrier member having a planar central portion and an angled outer peripheral flange portion, with said saucer-shaped members positioned in a back-to-back position to define a centerline therebetween, and said angled outer peripheral edged portions diverging from one another, and
    compressing the peripheral edge flange portion of said barrier member against said stop member to expand said barrier member to engage the tubular housing to provide a barrier seal between the resultant chambers of the tubular housing.

11. In the method of providing a barrier seal in accordance with claim 10, wherein said angled outer peripheral edge portions diverge at an angle of between about 20–30 degrees with respect to said centerline of said planar central portion.

* * * * *